United States Patent
Grantz

(10) Patent No.: US 7,213,972 B2
(45) Date of Patent: *May 8, 2007

(54) NON-RECIRCULATING CONICAL FLUID DYNAMIC BEARING FOR AN ELECTRIC MOTOR

(75) Inventor: Alan Lyndon Grantz, Aptos, CA (US)

(73) Assignee: Seagate Technology LLC, Scotts Valley, CA (US)

(*) Notice: Subject to any disclaimer, the term of this patent is extended or adjusted under 35 U.S.C. 154(b) by 254 days.

This patent is subject to a terminal disclaimer.

(21) Appl. No.: 10/609,310

(22) Filed: Jun. 26, 2003

(65) Prior Publication Data

US 2004/0005101 A1 Jan. 8, 2004

Related U.S. Application Data

(60) Provisional application No. 60/393,567, filed on Jul. 1, 2002.

(51) Int. Cl.
*F16C 32/06* (2006.01)

(52) U.S. Cl. .................................... 384/110
(58) Field of Classification Search ............... 384/100, 384/110, 112, 114, 119, 120, 121, 123, 124, 384/132; 360/99.08, 99.07
See application file for complete search history.

(56) References Cited

U.S. PATENT DOCUMENTS

| | | | | |
|---|---|---|---|---|
| 3,674,355 A | * | 7/1972 | Yearout et al. | ............. 384/110 |
| 5,246,294 A | * | 9/1993 | Pan | ............. 384/119 |
| 5,407,281 A | * | 4/1995 | Chen | ............. 384/107 |
| 5,448,120 A | * | 9/1995 | Schaule et al. | ............. 310/90 |
| 5,793,129 A | | 8/1998 | Parsoneault et al. | |
| 5,980,113 A | | 11/1999 | Grantz | |
| 5,997,179 A | | 12/1999 | Khan | |
| 5,997,357 A | | 12/1999 | Grantz | |
| 6,005,748 A | | 12/1999 | Heine et al. | |
| 6,019,516 A | | 2/2000 | Leuthold et al. | |
| 6,065,877 A | | 5/2000 | Leuthold et al. | |
| 6,069,767 A | | 5/2000 | Khan et al. | |
| 6,069,768 A | | 5/2000 | Heine et al. | |
| 6,118,620 A | | 9/2000 | Grantz et al. | |
| 6,119,348 A | | 9/2000 | Jennings et al. | |
| 6,130,802 A | | 10/2000 | Rahman et al. | |
| 6,137,650 A | | 10/2000 | Heine et al. | |
| 6,144,523 A | * | 11/2000 | Murthy et al. | ............. 360/99.08 |
| 6,148,501 A | | 11/2000 | Grantz et al. | |
| 6,149,161 A | | 11/2000 | Grantz et al. | |
| 6,154,339 A | | 11/2000 | Grantz et al. | |
| 6,181,039 B1 | | 1/2001 | Kennedy et al. | |
| 6,267,869 B1 | | 7/2001 | MacLeod et al. | |
| 6,280,088 B1 | | 8/2001 | Leuthold et al. | |
| 6,292,328 B1 | | 9/2001 | Rahman et al. | |
| 6,307,291 B1 | | 10/2001 | Iwaki et al. | |
| 6,322,252 B1 | | 11/2001 | Grantz et al. | |
| 6,361,214 B1 | * | 3/2002 | Ichiyama | ............. 384/107 |
| 6,371,650 B1 | | 4/2002 | Goto et al. | |
| 6,394,654 B1 | | 5/2002 | Khan et al. | |
| 6,519,112 B1 | * | 2/2003 | Iwaki | ............. 360/99.08 |
| 2003/0223660 A1 | * | 12/2003 | Grantz et al. | ............. 384/110 |

FOREIGN PATENT DOCUMENTS

JP 2002-122134 A 4/2002

* cited by examiner

*Primary Examiner*—Thomas R. Hannon
*Assistant Examiner*—Justin Krause
(74) *Attorney, Agent, or Firm*—Morrison & Foerster LLP

(57) ABSTRACT

A fluid dynamic bearing design featuring a shaft, a first and second conical bearing affixed, respectively, to a first and second end of the shaft, and asymmetric seals on each bearing. The asymmetric seals pump fluid into reservoirs on the first and second conical bearings.

18 Claims, 5 Drawing Sheets

NON-RECIRCULATING CONICAL FLUID DYNAMIC BEARING FOR AN ELECTRIC MOTOR

CROSS REFERENCE TO RELATED APPLICATIONS

This application claims the priority of a United States Provisional Application 60/393,567 filed Jul. 1, 2002 by Grantz (entitled "Non-Recirculating Conical Fluid Dynamic Bearing"), which is herein incorporated by reference.

FIELD OF THE INVENTION

The invention relates to disk drive motors in general and particularly to fluid dynamic bearings used in disk drive motors.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks. The bearing assembly that supports the storage disk is of critical importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. Fluid dynamic bearings spread the bearing surface over a large surface area, as opposed to a ball bearing assembly, which comprises a series of point interfaces. This is desirable because the increased bearing surface reduces wobble or run-out between the rotating and fixed members. Further, the use of fluid in the interface area imparts damping effects to the bearing, which helps to reduce non-repeat run-out. Thus, fluid dynamic bearings are an advantageous bearing system.

A common fluid dynamic bearing design incorporates dual conical shaped bearings mounted on each end of a fixed shaft. The bearings further typically employ internal pathways for the re-circulation of fluid around the cones, as well as grooved surfaces disposed on an axial surface between the cones that pump fluid into capillary seals. However, as the size, height, and power consumption of fluid dynamic bearing motors is decreased, several problems become more prominent with this particular design. This is largely due to the fact that reduction in feature size is the preferred method of reducing overall motor power consumption. For one, the reduction in the diameter of the cones leaves less room available for re-circulation paths. Providing a re-circulation path is even more difficult when a cone is formed as an integral part of the shaft, because there is no space in between the cone and shaft for fluid re-circulation. Additionally, as motors overall become shorter, the axial spacing between the conical bearings is reduced, making it impractical or unfeasible to include pumping grooves on the surface therebetween.

Therefore, a need exists for a fluid dynamic bearing design that accommodates current size, height, and power consumption demands without compromising the functionality of the bearings.

SUMMARY OF THE INVENTION

The invention provides a fluid dynamic bearing design featuring a shaft, a first and second conical bearing affixed, respectively, to a first and second end of the shaft, and asymmetric seals on each bearing. The asymmetric seals pump fluid into reservoirs on the first and second conical bearings.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
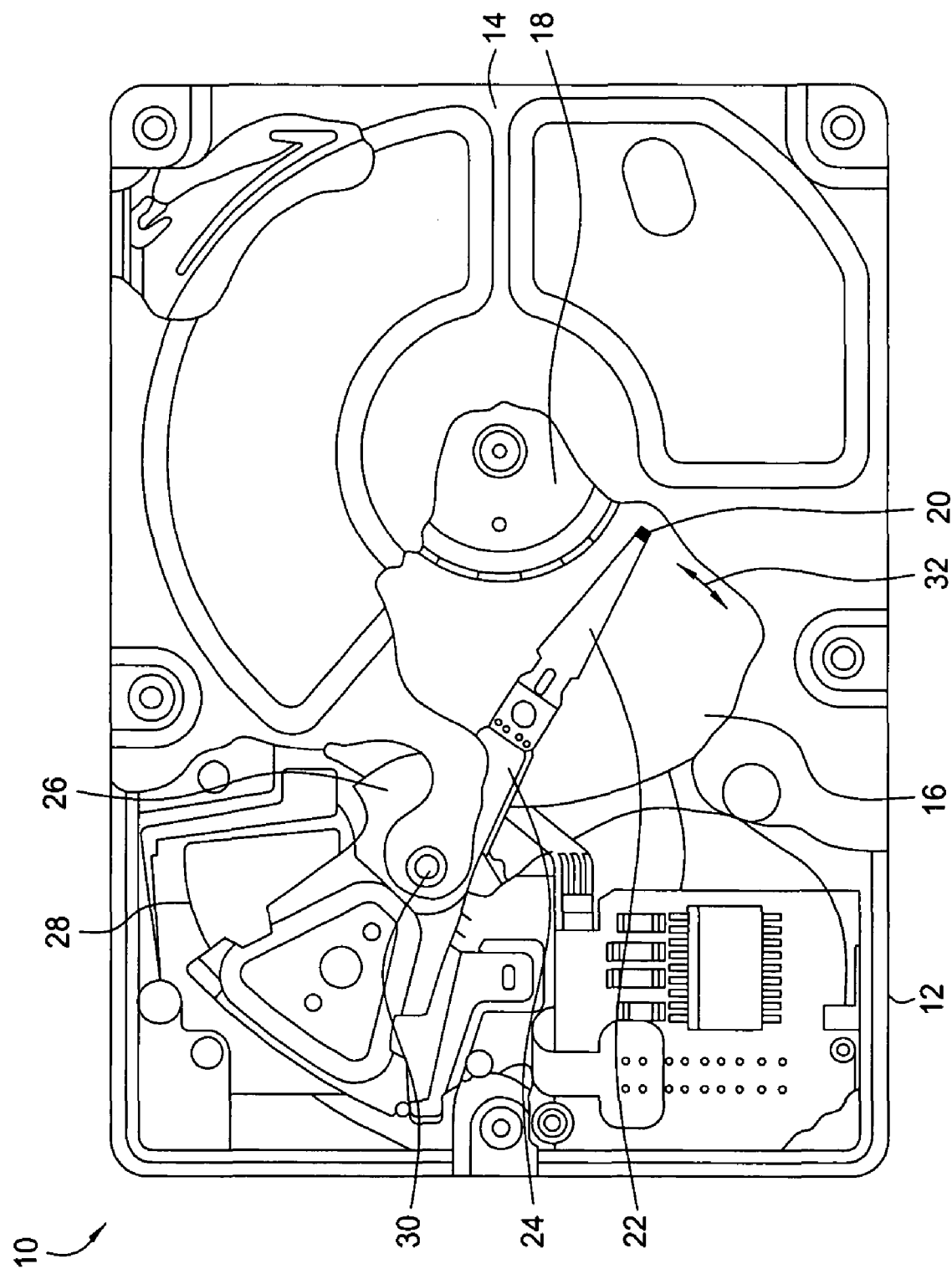
FIG. 1 depicts a plan view of one embodiment of a disk drive that comprises a motor in accordance with embodiments of the present invention.

FIG. 1 depicts a plan view of one embodiment of a disk drive 10 for use with embodiments of the invention. Referring to FIG. 1, the disk drive 10 includes a housing base 12 and a top cover 14. The housing base 12 is combined with top cover 14 to form a sealed environment to protect the internal components from contamination by elements outside the sealed environment. The base and top cover arrangement shown in FIG. 1 is well known in the industry; however, other arrangements of the housing components have frequently been used, and aspects of the invention are not limited by the particular configuration of the disk drive housing.

Disk drive 10 further includes a disk pack 16 that is mounted on a hub 202 (see FIG. 2) for rotation on a spindle motor (not shown) by a disk clamp 18. Disk pack 16 includes one or more individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 2A:
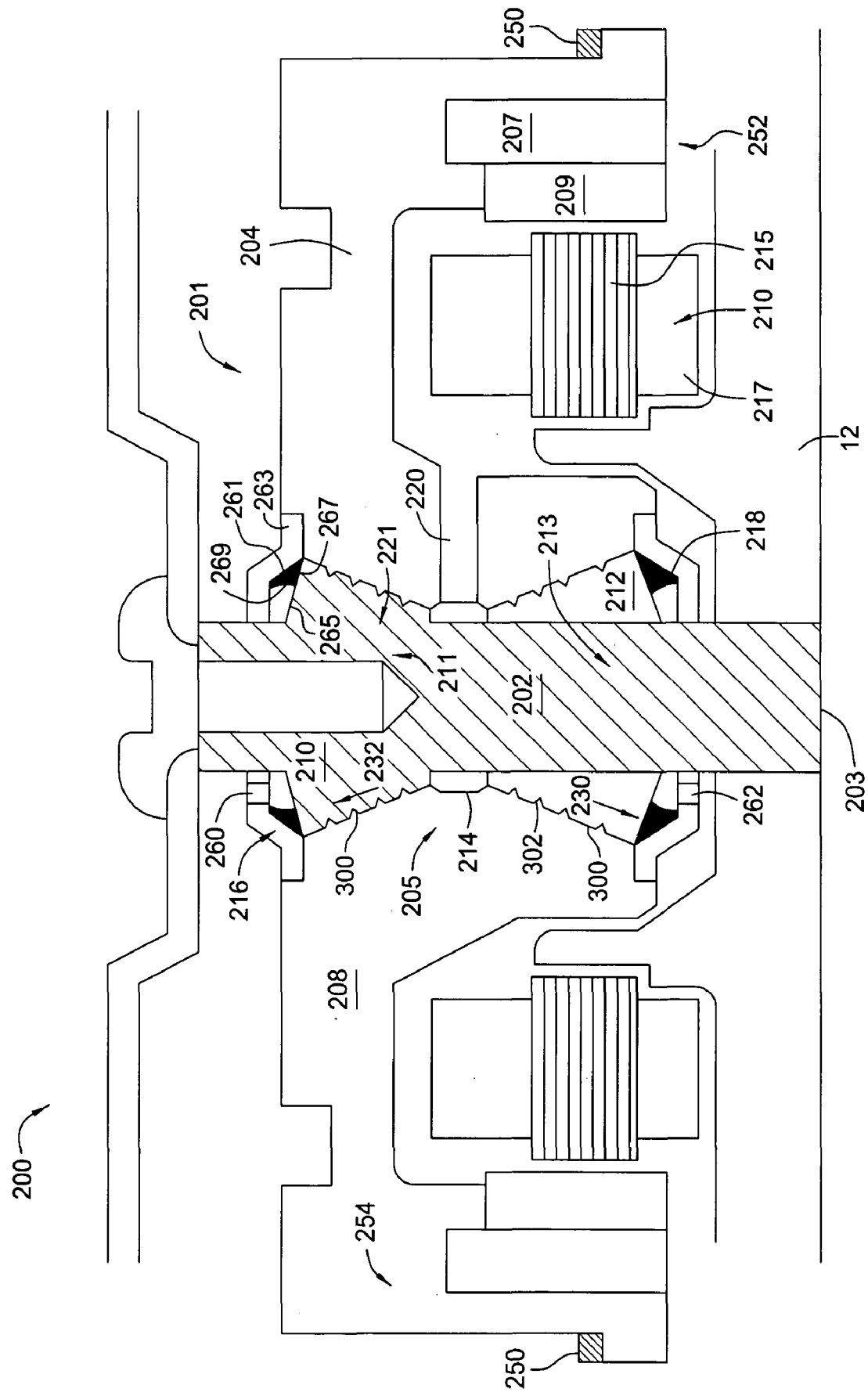
FIGS. 2A and 2B depict two embodiments of a non re-circulating conical fluid dynamic bearing motor according to the present invention.

FIG. 2A is a sectional side view of a portion of a non re-circulating conical fluid dynamic bearing motor 200 according to the present invention. Motor 200 comprises a rotating assembly 201, a stationary assembly 203, and a bearing assembly 205.

The rotating assembly 201 comprises a hub 204 that supports at least one disk 250 for rotation and a sleeve 208 affixed to or integrated with the hub that supports a magnet assembly 252 comprising a back iron 207 with a magnet 209 affixed thereon. In one embodiment of the invention, the magnet assembly 252 is positioned on the inside circumferential surface 254 of the hub 204.

The stationary assembly 203 comprises a shaft 202 mounted to the base 12. The shaft 202 is disposed through a bore 221 in the sleeve 208 and supports the hub 204 for rotation. A stator 210 mounted on the base 12 cooperates with the magnet 209 on the hub 204 to induce rotation of the hub 204 relative to the shaft 202. The stator 210 comprises a plurality of "teeth" 215 formed of a magnetic material such as steel, where each of the teeth 215 is wound with a winding or wire 217.

Figure 2B:
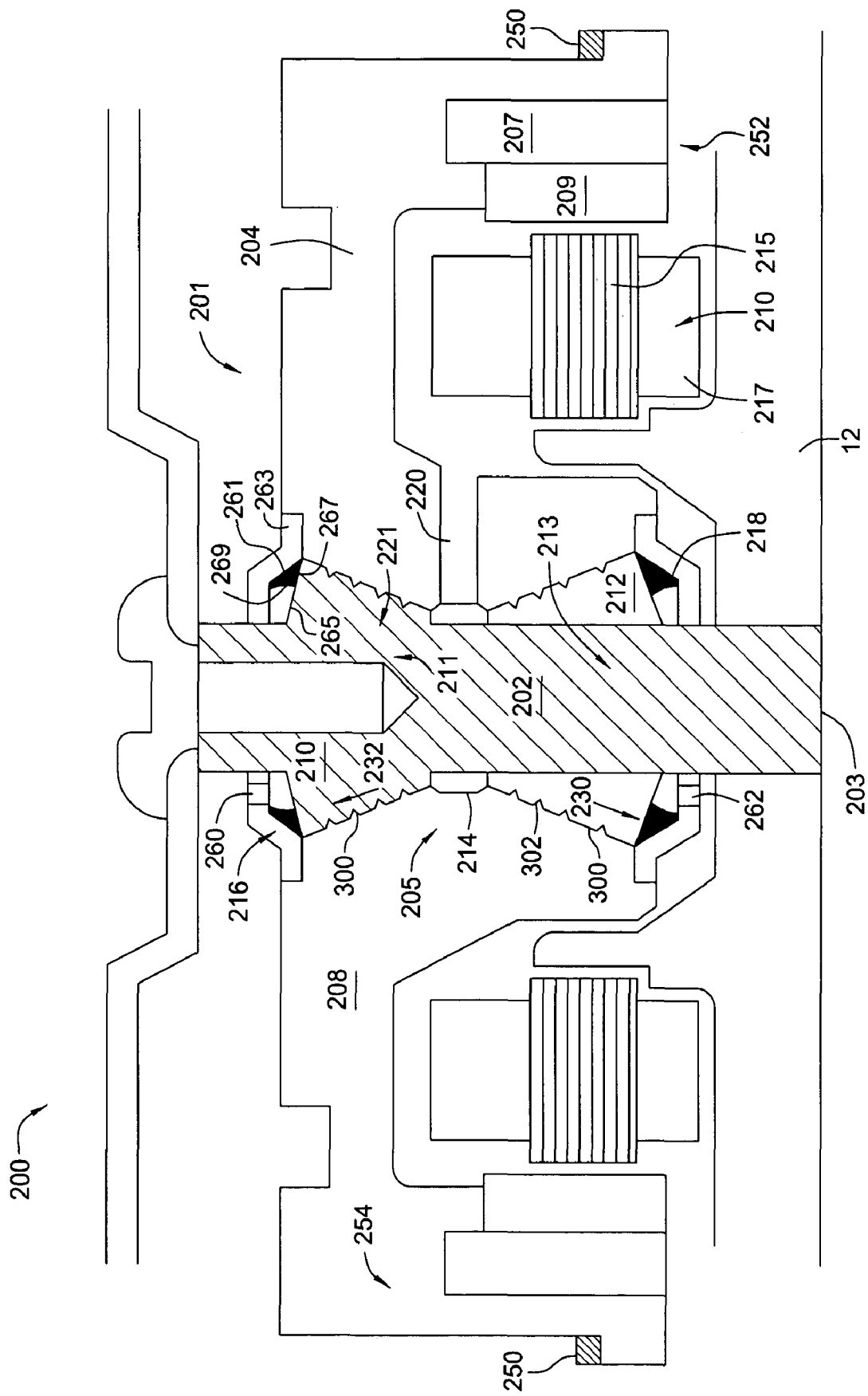

The bearing assembly 205 comprises a first conical bearing 210 and a second conical bearing 212 affixed to the shaft 202. The first conical bearing 210 may be formed integral with a first end 211 of the shaft 202, as shown in FIG. 2A, while the second conical bearing 212 may be, for example, press fit onto the shaft in a region 213 spaced toward a second end of the shaft 202. Alternatively, both bearings 210, 212 may be independent pieces that are press fit onto the shaft 202, as shown in FIG. 2B. Forming the first conical bearing 210 integral with shaft 202 creates a larger diameter at the first end 201 of the shaft 202, despite an overall decreased feature size, as compared to prior art bearing assemblies; this makes it easier to insert a fastener such as a screw or the like into the shaft to hold a disc clamp or upper housing in place.

A fluid 214 such as air, oil, or gas is disposed between surfaces of the conical bearings 210, 212, and the facing surfaces of sleeve 208. The fluid may be introduced through vented plenum 220 that separates first and second conical bearings 210, 212 and extends entirely through the sleeve 208. This plenum also serves to maintain fluid separation between the bearings. Alternatively, fluid can be introduced into the upper bearing through vent/access hole 260 that leads into capillary seal 216; fluid would be introduced into the lower bearing through the plenum 220. The first and second conical bearings 210, 212 further comprise fluid dynamic grooves 300, 302. The fluid dynamic grooves 300, 302 help to support stable relative rotation of the hub 204 to the shaft 202; their design is asymmetric so that there is a pressure bias appropriate to drive fluid toward the reservoir/seal 216, 218 defined at the wider end of each conical bearing. The reservoir/seal 216 is defined by relatively diverging surfaces 261 of shield 263 and surface 265 of conical bearings 210. Fluid can be inserted thru vent 260 into the reservoir region 267 which terminates at meniscus 269. Reservoir/seal 218 is of similar design; Vent 262 is provided primarily for establishing the meniscus; because of its location, it typically is not used to insert fluid. Alternatively, the grooves 300, 302 could be formed on the surface of the sleeve 208 facing the bearings 210, 212.

Because the pumping grooves 300, 302 have an asymmetric geometry, this seal design is referred to in the art as an "asymmetric seal". Utilizing grooves 300, 302 as described minimizes or eliminates the need for pumping seals on the shaft 202, thus allowing the cones 210, 212 to be moved closer together on the shaft 202. Moving the cones 210, 212 closer together allows for a shorter motor 200, which in turn reduces motor power consumption.

Centrifugal capillary seals 216, 218 and define fluid reservoirs 260, 262 between the capillary seals 216, 218 and the conical bearings 210, 212; that is, when the motor 200 is spun down, fluid 214 is returned from the capillary seals 216, 218 to the volume occupied by the grooves 300, 302. Pumping fluid 214 as described above eliminates the need for internal re-circulation conduits in cones 210, 212 (e.g., drilled or preformed pathways), so that the size of the cones 210, 212 may be reduced without compromising functionality.

Figure 2C:
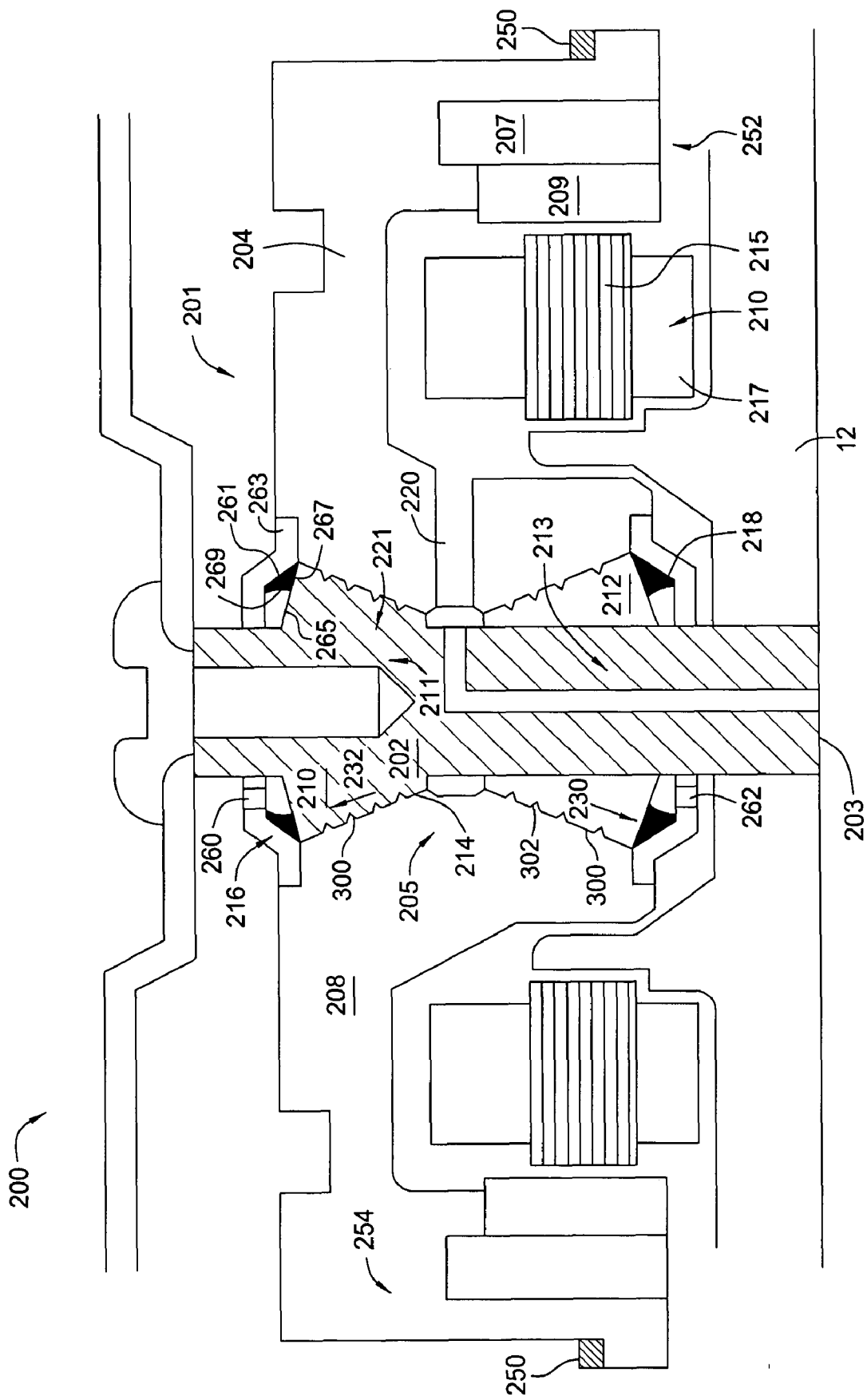
FIG. 2C illustrates an alternate approach to venting the bearing system.

FIG. 2C illustrates an alternative to the embodiments of FIGS. 2A and 2B in the sense that the vent 270, rather than extending radially outward through the sleeve, extends primarily axially through the sleeve. Preferably, for ease of fabrication the vent includes a radial section 270A and an axial section 270B. This eliminates the need to precisely align the vent in the sleeve with the ungrooved region of the shaft 202.

Figure 3:
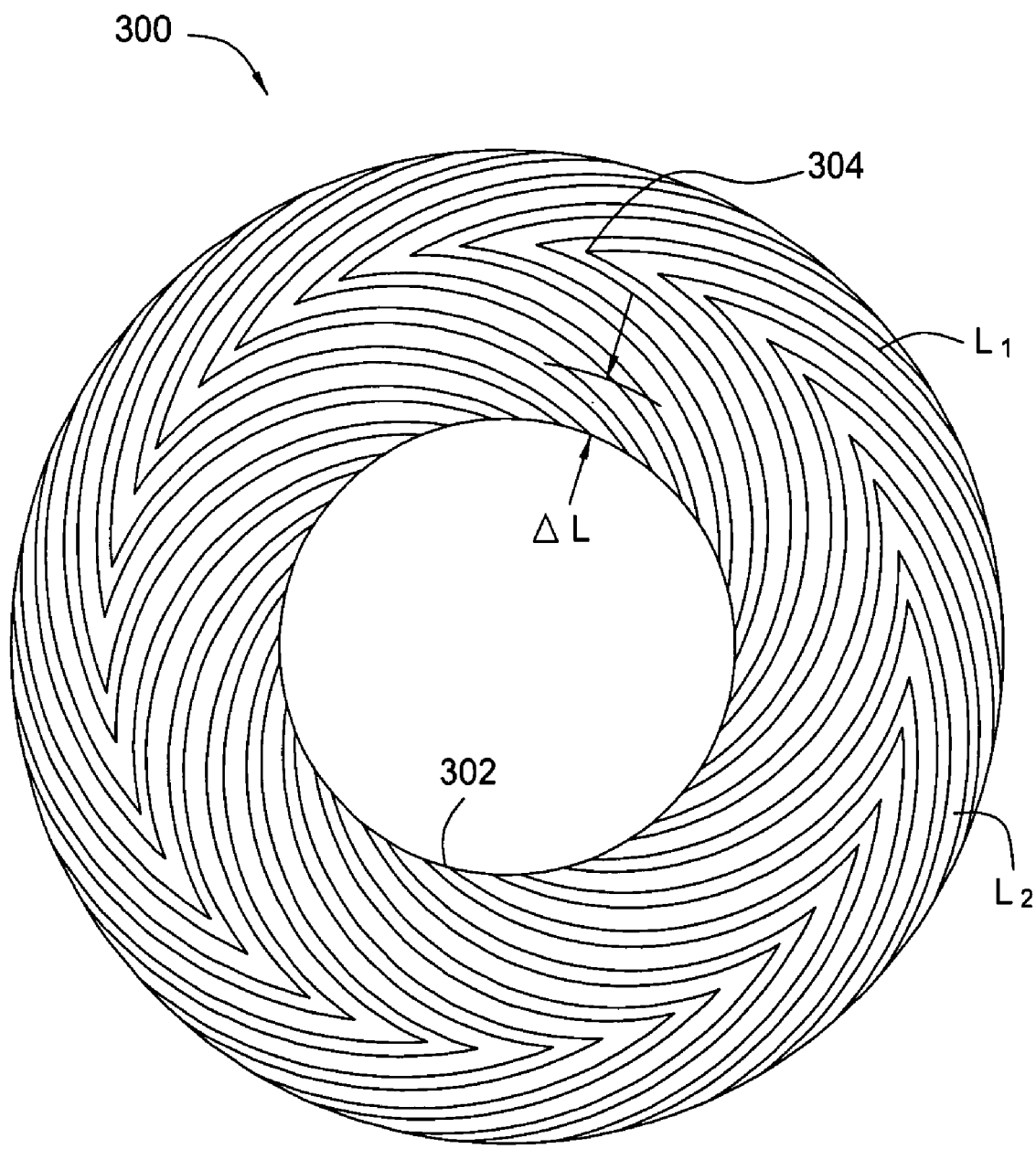
FIG. 3 depicts a set of fluid dynamic grooves for use in the motor of FIG. 2.

As demonstrated in FIG. 3, the fluid dynamic grooves 300 form a ring around the cones 210, 212 (as do pumping grooves 302) and may comprise a herringbone pattern as shown, or may alternately comprise a chevron, spiral or sinusoidal pattern (not shown). The herringbone, or V-shaped pattern, illustrated in FIG. 3B generates a pressure distribution across the bearing surface that provides improved bearing rocking stiffness. The grooves 300 comprise two "legs", that meet at an apex 304. Generally, the apex 304 of the grooves 300 is located near a midpoint along the operating surface—of the cone 210, 212. When rotated in a direction against the herringbone, fluid dynamic grooves 300 draw fluid 214 toward the apex 304 of the grooves 300. Pumping grooves 302 may comprise asymmetric extensions of fluid dynamic grooves 300, as depicted by legs $L_1$ and $L_2$ that meet at an apex 304, where the length of $L_1$ is greater than the length of $L_2$ (by a length of $\Delta L$ as demonstrated by FIG. 3). When asymmetry of the pattern is created by legs with different lengths, a net flow of fluid 214 is pumped toward the leg with the shorter length. In the embodiment shown in FIGS. 2A–C, the leg with the shorter length would be located proximate capillary seals 216, 218, so that the fluid 214 is pumped into the reservoirs 260, 262 defined by the seals 216, 218.

Utilizing conical bearings 210, 212 as described will maximize both journal spacing and rocking stiffness, particularly if the apexes 304 of the fluid dynamic grooves 300 are located near the midpoints of the cones 210, 212. In addition, the reaction forces in conical bearings 210, 212 will produce a restoring moment to the shaft 202.

Therefore, the present invention represents a significant advancement in the field of conical fluid dynamic bearing motors. Structural integrity and functionality is maintained, while feature size is reduced so that the motor consumes substantially less power.

While the foregoing is directed to embodiments of the invention, other and further embodiments of the invention may be devised without departing from the basic scope thereof, and the scope thereof is determined by the, claims that follow.

What is claimed is:

1. An electric motor comprising:
   a fixed shaft;
   a first conical bearing integral with a first end of the shaft;
   a second conical bearing fixed to a second end of the shaft;
   a rotatable sleeve disposed around the shaft and the first and second conical bearings;
   a vented plenum separating the first and second conical bearings wherein the vented plenum extends from the shaft through the sleeve to an outer surface of the sleeve; and
   asymmetric grooves on the bearings pumping toward the outer ends of the shaft.

2. The electric motor according to claim 1, further comprising:
   a fluid between the first and second conical bearings and the sleeve.

3. The electric motor according to claim 2, wherein each of said first and second conical bearings is sealed by a capillary seal at a wider end of the bearing.

4. The electric motor according to claim 3, wherein said first and second conical bearings farther comprise pumping grooves that pump fluid toward the reservoirs defined by the capillary seals.

5. The electric motor according to claim 4, wherein the pumping grooves are asymmetric extensions of the fluid dynamic grooves.

6. The electric motor according to claim 3, wherein the capillary seal defines a fluid reservoir.

7. The electric motor according to claim 6, wherein the capillary seal is a centrifugal capillary seal.

8. The electric motor according to claim 7, wherein the grooves comprise fluid dynamic grooves circumscribing the surface of the bearing.

9. The electric motor according to claim 8, wherein the fluid dynamic grooves comprise an asymmetric V-shaped pattern.

10. A disk drive motor comprising:
    means for rotatably supporting at least one disk;
    a stationary shaft disposed through the supporting means in a spaced apart relation;
    a first conical bearing integral with the shaft, and a second conical bearing supported on the shaft;
    an asymmetric groove pattern on the conical bearings pumping toward opposite ends of the shaft and vent means separating the first and second conical bearings, wherein the vent means extends through a rotatable sleeve to an outer surface of the sleeve.

11. The disk drive motor according to claim 10, wherein the means for rotatably supporting the at least one disk further comprises:
    a hub;
    a magnet assembly mounted to the hub; and
    a stator disposed proximate the magnet assembly to induce rotation of the hub relative to die stationary shaft.

12. The disk drive motor according to claim 11, further comprising a fluid between the stationary shaft and the means for supporting the at least one disk.

13. The electric motor according to claim 12, wherein said first and second conical bearings further comprise pumping grooves that pump fluid toward The reservoirs defined by the capillary seals.

14. The electric motor according to claim 12, wherein the grooves comprise fluid dynamic grooves circumscribing the surface of the bearing.

15. The electric motor according to claim 12, wherein the vented plenum extends from the shaft through the sleeve to an outer surface of the sleeve.

16. The disc drive motor according to claim 12 wherein the vent means comprise a vented plenum extending through the sleeve.

17. The electric motor according to claim 12, wherein each of said first and second conical bearings is scaled by a capillary scal at a wider end of the bearing.

18. The electric motor according to claim 17, wherein the capillary seal is a centrifugal capillary seal.

* * * * *